United States Patent [19]
Piana

[11] Patent Number: 5,174,194
[45] Date of Patent: Dec. 29, 1992

[54] AUTOMATIC MACHINE FOR PREPARING ESPRESSO COFFEE

[76] Inventor: Giuseppe S. Piana, Via Novara 136, I-28078 Romagnano Sesia, Italy

[21] Appl. No.: 61,258
[22] PCT Filed: Sep. 4, 1986
[86] PCT No.: PCT/EP86/00512
  § 371 Date: Jun. 17, 1987
  § 102(e) Date: Jun. 17, 1987
[87] PCT Pub. No.: WO87/01570
  PCT Pub. Date: Mar. 26, 1987

[30] Foreign Application Priority Data
Sep. 12, 1985 [IT] Italy ............... 53773/85[U]

[51] Int. Cl.⁵ ............................ A47J 31/42
[52] U.S. Cl. ................... 99/286; 99/289 R
[58] Field of Search ............ 99/279, 286, 289 R, 99/289 P, 280, 283, 281, 282, 287, 300, 302 R, 302 P, 304, 307; 241/100

[56] References Cited
U.S. PATENT DOCUMENTS 3,791,284 2/1974 Donot ............... 99/302 R
4,172,413 10/1979 Roseberry ............ 99/286
4,188,863 2/1980 Grossi ............... 99/286

Primary Examiner—Robert W. Jenkins
Attorney, Agent, or Firm—Sughrue, Mion, Zinn, Macpeak & Seas

[57] ABSTRACT

The machine includes a motor-driven conveyor screw provided in a supply duct connecting the coffee grinder to a percolation chamber to move the ground coffee at a rate higher than that of its supply from the coffee grinder. Preferably, the percolation chamber has an associate prechamber into which the supply duct opens. A device for closing the percolation chamber and compressing the charge of coffee comprises a tamper which is reciprocable between a withdrawn position in which it does not occupy the prechamber and closes its side opposite the percolation chamber and an advance position of compressing the charge in the chamber and sealing the chamber. The percolation chamber is a through-chamber with open ends, one being a continuation of the through-chamber and the other, as part of the means for closing the chamber, being associated with the counter-tamper obturator movable towards and away from an advance position in which it closes the other end both to allow the compression of the charge of ground coffee in the chamber by means of the tamper and to seal the chamber. The tamper is movable to an even further advance position beyond the said other end of the chamber to expel the compressed coffee.

14 Claims, 5 Drawing Sheets

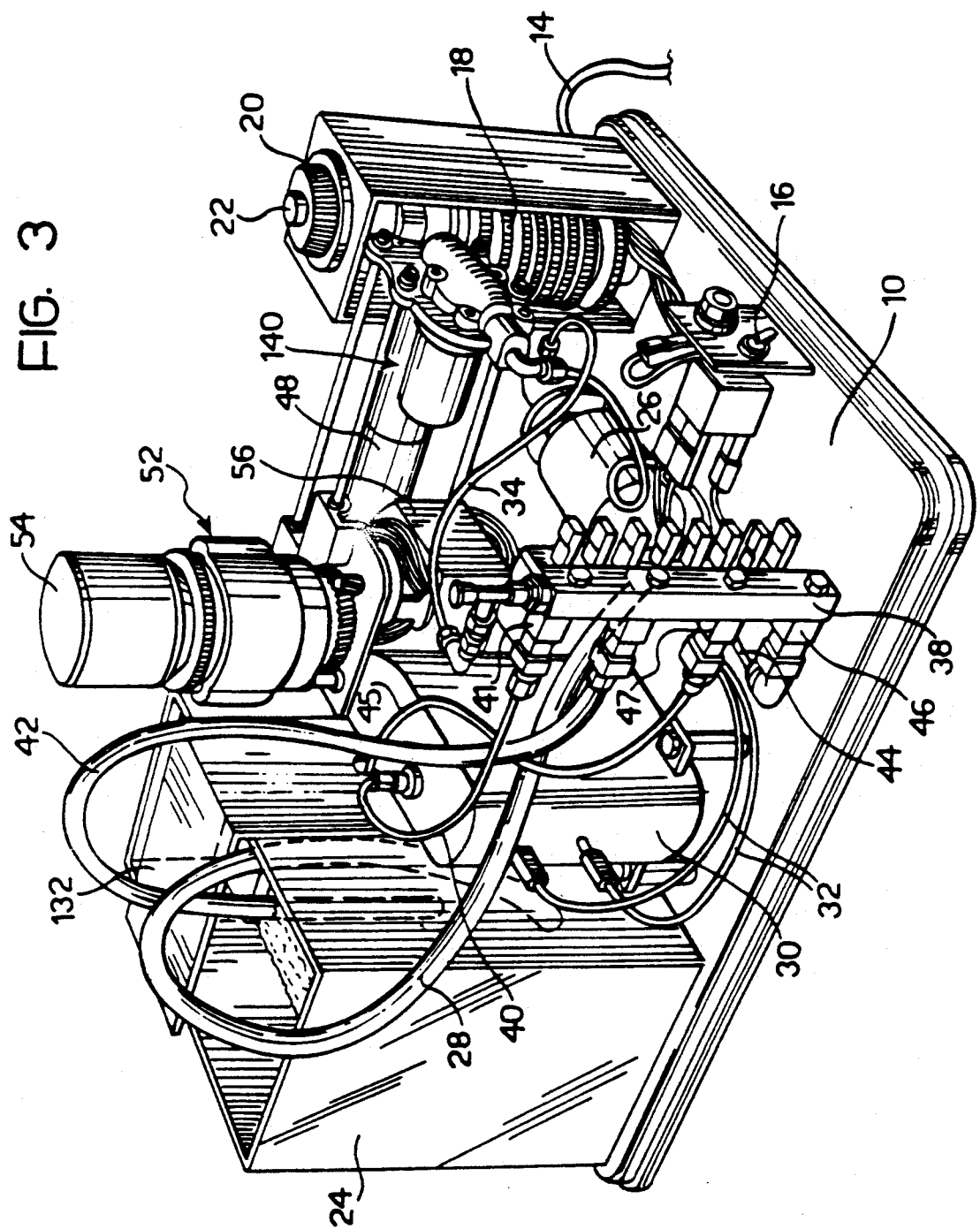

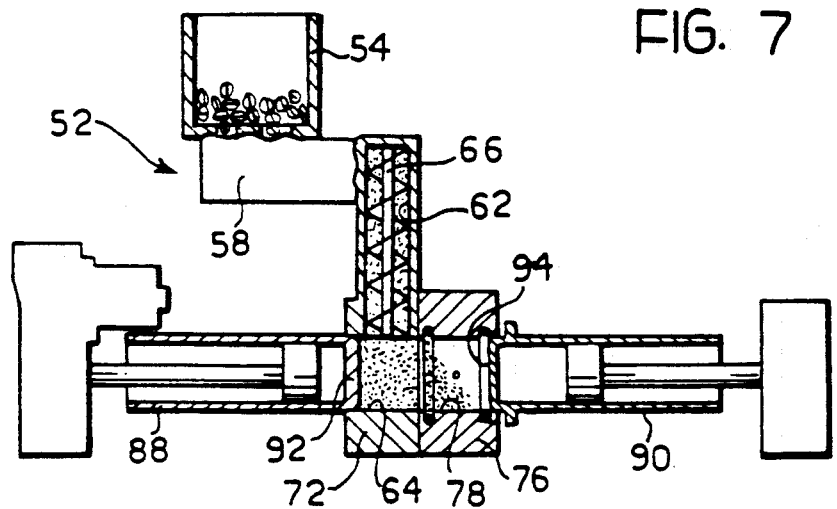
FIG. 7
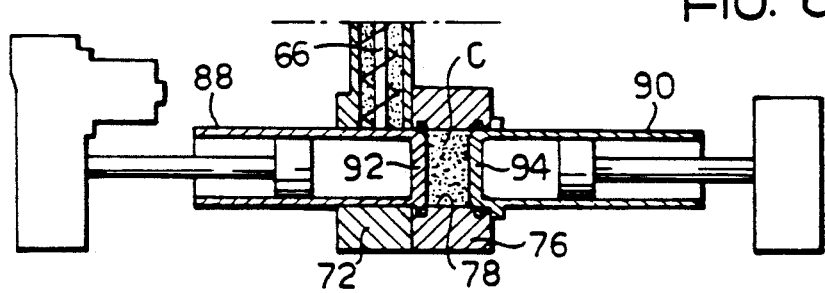
FIG. 8
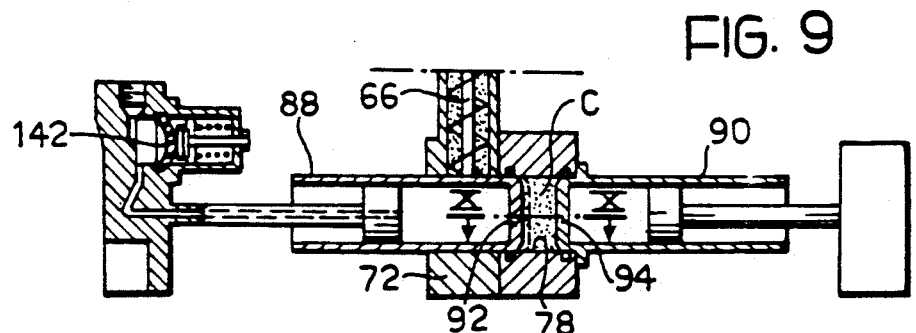
FIG. 9
FIG. 11
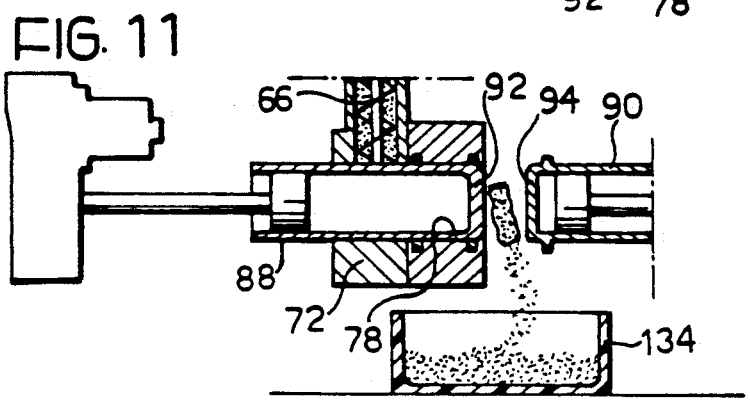
FIG. 10
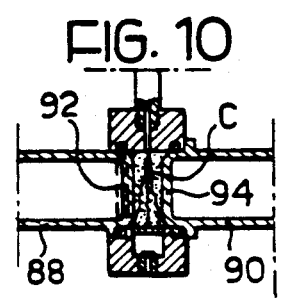

AUTOMATIC MACHINE FOR PREPARING ESPRESSO COFFEE

BACKGROUND OF THE INVENTION

The subject of the present invention is an automatic machine for preparing espresso coffee from coffee beans, particularly for domestic use.

The machine of the invention is of the type comprising essentially:
- a motor-driven coffee grinder with a container for receiving a supply of coffee beans;
- a source of pressurised hot water;
- a percolation chamber connected by a supply duct to the output of the coffee grinder to receive a charge of ground coffee, and having means for closing the chamber and compressing the charge, means for expelling the coffee grounds, a port for the inlet of hot water from the source, and an outlet spout for the drink of coffee, and
- programmed means for controlling a cycle comprising, in succession, the grinding of the coffee and its supply to the percolation chamber, closure of the chamber and compression of the charge, percolation, and the expulsion of the exhausted coffee grounds.

Machines of this type are already known in which the ground coffee passes through the supply duct from the coffee grinder to the percolation chamber under gravity. A disadvantage of such machines is the fact that the duct frequently becomes blocked since the ground coffee, being rather thick, does not slide easily and cannot flow at the same rate as that at which it is supplied by the coffee grinder.

SUMMARY OF THE INVENTION

An object of the invention is to provide a machine which does not have this disadvantage. According to the present invention, this object is achieved by means of a machine of the type considered, characterised in that a motor-driven conveyor screw is provided in the supply duct connecting the coffee grinder to the percolation chamber, to move the ground coffee at a rate higher than that of its supply from the coffee grinder.

By virtue of this device, the possibility of blockages in the supply duct is eliminated completely.

Another object of the invention is to provide a machine of the type considered which lends itself to automatic operation by virtue of the use of simple practical means for closing the chamber, compressing the charge, and expelling the coffee grounds.

According to the invention, this object is achieved by means of a machine characterised in that a prechamber at the end of the descending duct is associated with the percolation chamber, and the means for closing the percolation chamber and compressing the charge of coffee comprise a tamper which is reciprocable between a withdrawn position in which it does not occupy the prechamber and closes its side opposite the percolation chamber and an advanced position of compressing the charge in the chamber and sealing the chamber in that the percolation chamber is a through-chamber with open ends, one being a continuation of the through-chamber and the other, as part of the means for closing the chamber, being associated with a counter-tamper obturator movable towards and away from an advanced position in which it closes the other end both to allow the compression of the charge of ground coffee in the chamber by means of the tamper and to seal the chamber and in that the tamper is movable to an even more advanced position beyond the said other end of the chamber to expel the compressed coffee.

In known machines of the type in question, the charge of ground coffee is not used to the full because the pressurised hot water inevitably follows an almost direct preferential path from the inlet opening to the outlet opening of the percolation chamber.

Yet another object of the invention is to provide a machine which enables almost the optimum use to be made of the ground coffee by virtue of a particular arrangement and configuration of the ports.

According to the invention, this object is achieved by means of a machine characterised in that the percolation chamber has a single inlet port for the pressurised hot water located at one side and a grating wall for the outlet of the hot water located on the opposite side and communicating with the spout in order to achieve a flow of water with a fan-shaped path through the charge of ground coffee.

By virtue of this solution, the pressurised hot water passes from the inlet to the outlet of the chamber with an expanding front instead of following a direct preferential path.

BRIEF DESCRIPTION OF THE INVENTION

Further characteristics and advantages of the invention will become apparent from a reading of the detailed description which follows with reference to the appended drawings, given purely by way of non-limiting example, in which:

FIG. 1 is an external perspective view of the machine,

FIG. 2 is a corresponding perspective view of it, on an enlarged scale, with the casing to a large extent removed, FIG. 3 is a perspective view from the side opposite FIG. 2, FIG. 4 is a longitudinal sectional view taken in the vertical plane indicated by the broken line IV—IV in FIG. 2, FIG. 5 is a cross-section taken substantially in the vertical plane indicated by the line V—V of FIG. 4, FIG. 6 is a partial section corresponding to FIG. 5 and illustrating the percolation path in the chamber, and FIGS. 7 to 11 are schematic longitudinal sections illustrating the various phases in the operating cycle.

DETAILED DESCRIPTION OF THE INVENTION

Figure 1:
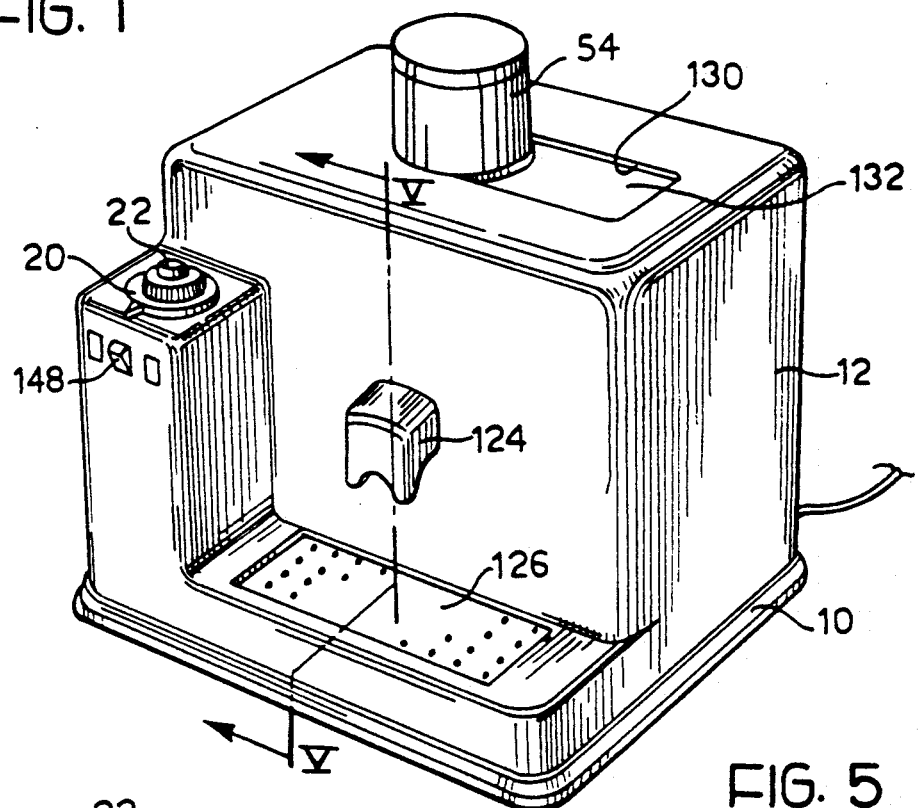

With reference to FIGS. 1 to 5, the machine includes a structural base 10 which supports most of its components. A removable casing or "body" 12 is associated with the base 10.

An electrical supply cable is indicated 14 and an isolating switch 16. A programmer is indicated 18 and, by way of example, is shown as being of mechanical type but could be replaced by an electronic programmer.

A knob for setting into the programmer 18 the number of cups of coffee it is desired to obtain, as will be explained below, is indicated 20. A push-button for starting the cycle of the machine is indicated 22.

A refillable water reservoir is indicated 24. An electric pump, indicated 26, draws water from the reservoir 24 during operation through a tube 28. A pressure-tight metal boiler is indicated 30. The boiler 30 has electrical heating resistances (not shown) controlled by a thermostat, also not shown. The supply cables for the resistances are indicated 32.

The pressurised water supplied by the pump 26 reaches a manifold 38 through a tube 34. From the latter, a tube 40 provided with a solenoid valve 41 controlled by the programmer 18 reaches the boiler and another tube 42 conveys the excess water back to the reservoir 24.

A further two tubes 44 and 45 extend from the manifold 38. These tubes are controlled by respective solenoids 46 and 47 which are controlled by the programmer 18 and supply respective opposing hydraulic actuators 48 and 50, of which more will be said below.

A coffee grinder, generally indicated 50, has a container 54 for a supply of coffee beans.

The container 54 projects from the top of the casing 12.

The coffee grinder 52 is driven by an electric motor 56 controlled by the programmer 18.

Figure 4:
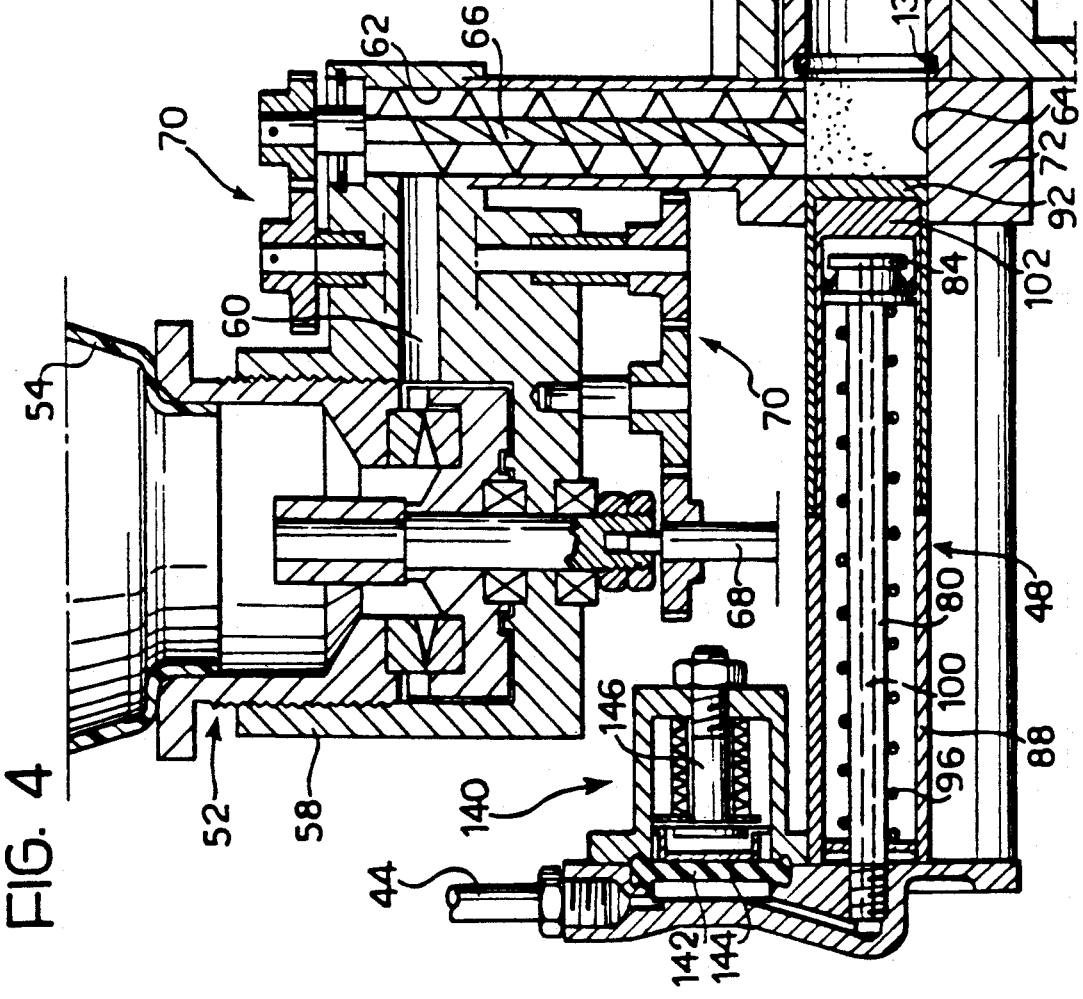

As shown in FIG. 4, the coffee grinder 52 includes a base body 58 with a laterally-projecting part in which is formed a horizontal outlet duct 60 for the ground coffee. The duct 60 opens into the top of a vertical, descending supply duct 62. The supply duct 62 opens at its lower end into a prechamber 64 of which more will be said below.

In the supply duct 62 is a conveyor screw 66. This screw 66 is driven by the shaft 68 of the electric motor 56 through a gear train the gears of which, generally indicated 70, are rotatably supported by the body 58.

The pitch of the screw 66 and the transmission ratio with which it is rotated by the motor 56 are such that the ground coffee in the supply duct 62 is moved at a rate higher than that of its supply from the coffee grinder 52. Thus, blockages of ground coffee in the path 60-62 are avoided completely, with the certainty that the desired quantity of ground coffee will always reach the prechamber 64 in each operating cycle of the machine.

The prechamber 64 is constituted by a cylindrical through-hole bored in a block 72. The block 72 is firmly fixed to a percolation block 74. The block 74 contains an insert 76 of bronze or other suitable material. A cylindrical through-hole 78 is formed in the insert 76 and acts as a percolation chamber.

The chamber 78 has the same diameter as the prechamber 64 and is aligned on the same horizontal axis.

The prechamber 64 and the corresponding end of the percolation chamber 78 have an associated hydraulic actuator 48, while the other end of the percolation chamber 78 has an associated hydraulic actuator 50.

The axes of these actuators coincide with that of the prechamber 64 and of the chamber 78.

Each actuator 48, 50 includes a respective fixed inner rod 80, 82 carrying a respective fixed piston 84, 86. Each piston is associated with a respective cylinder 88, 90 which is reciprocable.

The head of the cylinder 88, termed the tamper, is indicated 92. The head of the cylinder 90, termed the counter-tamper, is indicated 94.

The cylinder 88 is returned to a withdrawn position (to the left in FIG. 4) by a spring 96 which surrounds the rod 80. The cylinder 90 is returned to a withdrawn position (towards the right in FIG. 4) by a spring 98 which surrounds the rod 82.

Within the rod 80 there is an axial duct 100 which puts the tube 44 into communication (through the respective solenoid valve 46) with the hydraulic chamber 102 of the actuator 48 to cause the advance of the cylinder 83 (towards the right in FIG. 4).

Within the rod 82 there is a similar axial duct 104 which puts the tube 45 into communication (through its solenoid valve 47) with the hydraulic chamber 106 of the actuator 50 in order to cause the advance of the cylinder 90 (towards the left in FIG. 4).

As can be seen in FIG. 4, when the cylinder 88 is withdrawn, the tamper 82 is located in the mouth of the hole constituting the prechamber 64 and leaves free the communication of the supply duct 62 with the prechamber and the communication of the prechamber 64 with the percolation chamber 78.

As can also be seen in FIG. 4, when the cylinder 90 is withdrawn, the tamper 94 is remote from the corresponding end of the percolation chamber 78.

Specific reference will now be made to FIGS. 5 and 6 to describe the details of the percolation chamber.

The metal insert 76 is fixed to the metal body of the boiler 30 so that it is always kept hot and thus ensures that a drink of "boiling" coffee can always be obtained.

A pressure-tight tube 108 connects the interior of the boiler 30 with a duct 110 which is formed in the body of the boiler itself and in which there is a non-return valve 112 intended, as will be seen, to prevent dripping.

The downstream side of the valve 112 is connected to a horizontal hole 114 in the insert 76 which constitutes a single inlet port for the pressurised water into the percolation chamber 78. The port 114 is located at a point intermediate the axial ends of the chamber 78.

On the opposite side of the chamber 78 is an outlet port for the coffee drink. This port is constituted by a grating or perforated wall 116 which forms part of a block 118 housed in the insert 76. The grating wall 116 corresponds to a wide cylindrical sector which occupies substantially the entire length of the percolation chamber 78 and is centered relative to the inlet port 114.

Downstream of the grating wall 116 is a manifold chamber 120 in the block 118, which communicates with a pair of ducts 122 formed in a supply spout 124 fixed to the block 118 and the insert 76.

A machine with a spout 124 for two cups of coffee has been shown in the drawings, but it is understood that the spout could be arranged to supply a single cup or more than two cups.

Figure 2:
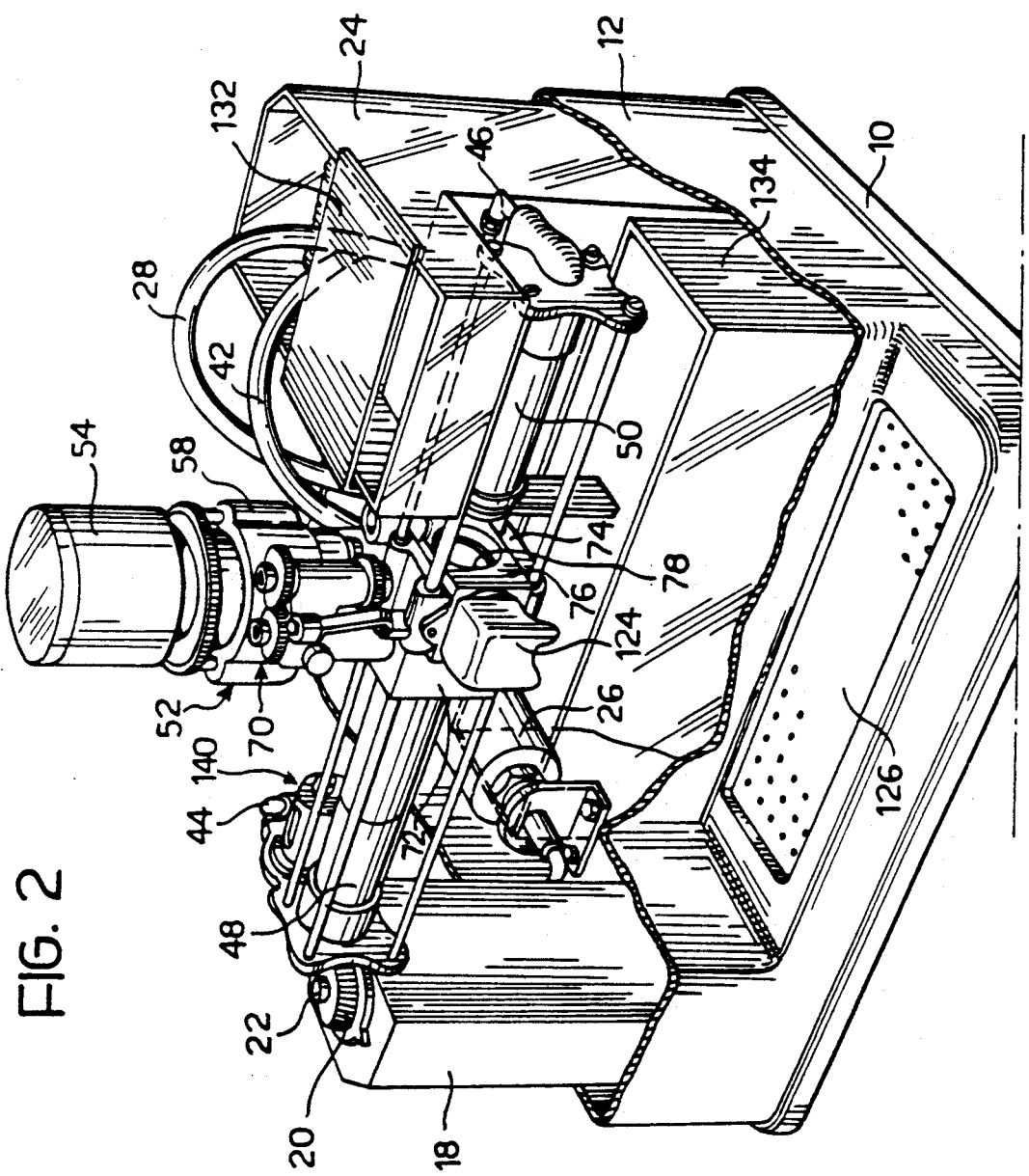

As shown in FIG. 1 and 2, the spout 124 overlies a perforated plate 126 for supporting the cups to be filled. Under the plate 126 (FIG. 5) is a removable vessel 128 for collecting liquid accidentally spilt on the plate 126.

Figure 6:
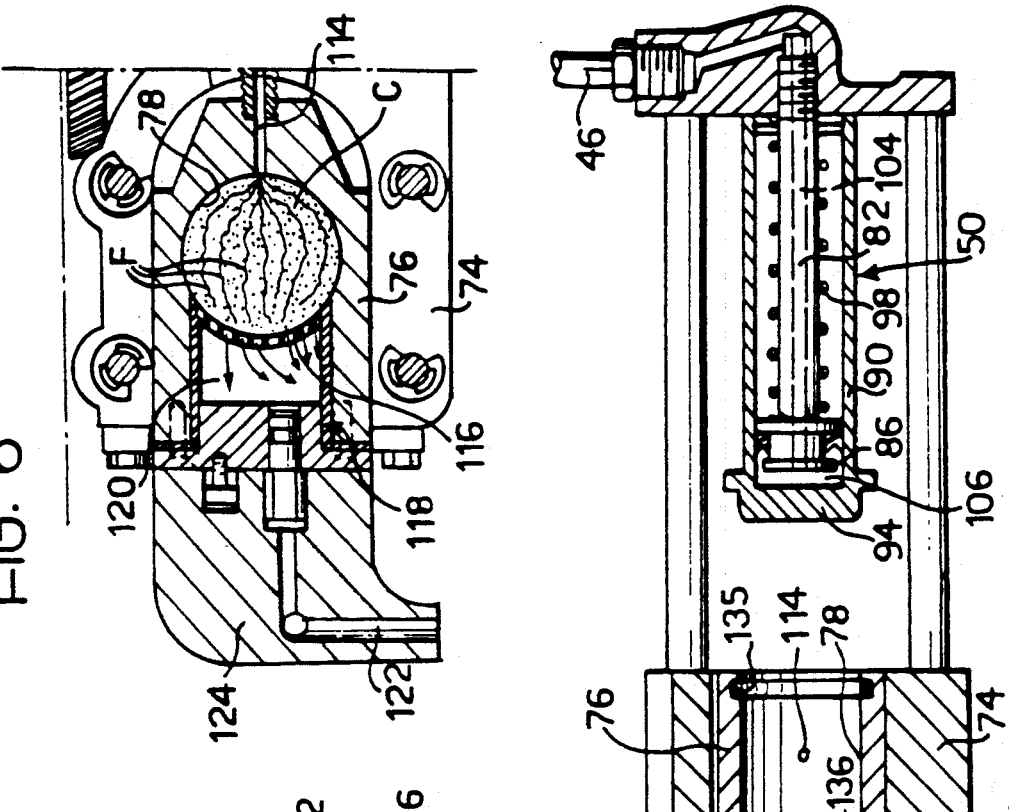

In FIG. 6 it is supposed that the percolation chamber 78 contains a charge of ground coffee, indicated C, introduced as will be described below.

The arrangement and configuration of the inlet port 114 and outlet port 116 enable a flow of water to be obtained, as indicated by the lines F, with a fan-shaped path through the charge C of ground coffee. This enables almost optimum extraction of the aromatic substances in the coffee to be achieved since the pressurized hot water is propagated through the charge C along a front which widens as it proceeds from the inlet to the outlet, without the jet of water excavating a preferential path directly from the inlet to the outlet. Naturally, a percolation chamber with a triangular cross-section diverging from the inlet to the outlet would be preferable but for technological reasons, as will be understood, it is instead preferable to give the chamber 78, the prechamber 64, and the cylinders 88 and 90 a cylindrical cross section.

Before passing on to the description of an operating cycle of the machine, some further characteristics of it will be indicated. As can be seen in FIG. 1, a wide aperture 130 is formed in the top of the casing or body 12. This aperture defines the periphery of a hot-plate 132 on which the cups may be placed to be preheated. The plate 132, also visible in FIGS. 2 and 3, is fixed to the body of the boiler 30 or is made in a single piece therewith, so as to receive heat from the water in the boiler.

Figure 5:
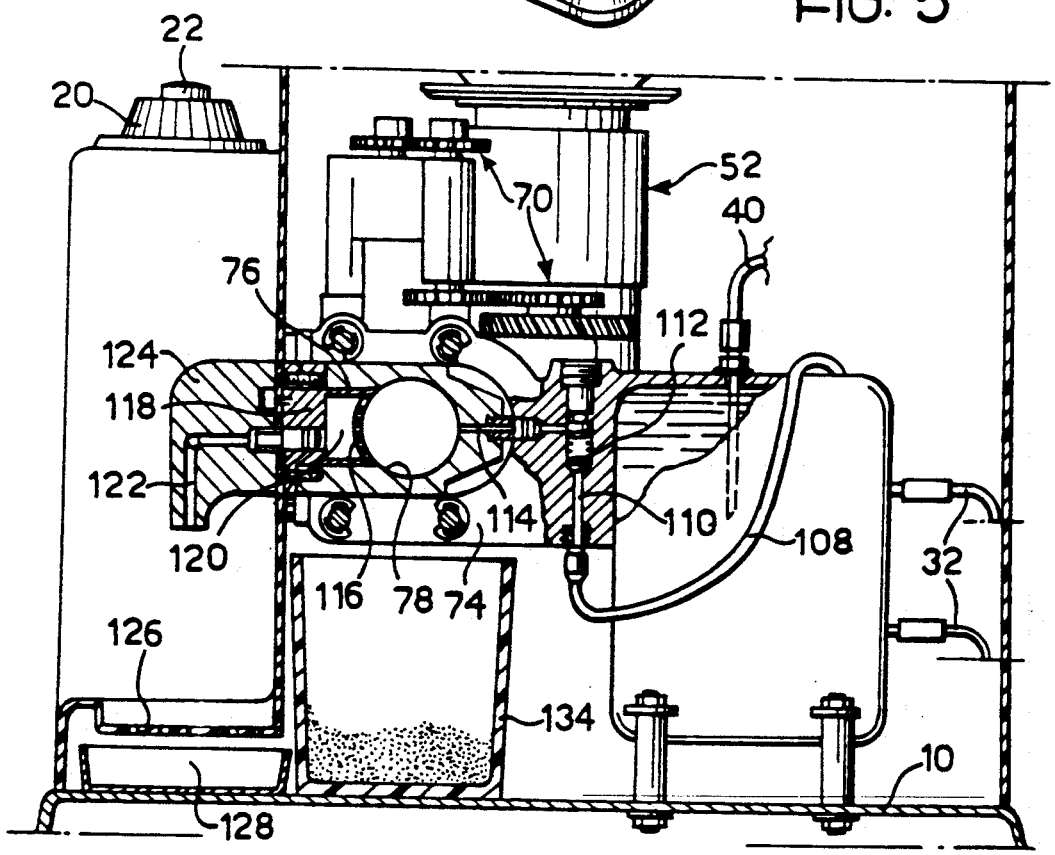

As shown in FIGS. 2 and 5, under the group of actuators 48 and 50 is a removable vessel 134 which rests on the base 10 and is intended to receive the coffee grounds, which as will be seen, are made to fall from the chamber 78 after a cycle in which the drink is prepared.

Reference will now be made to FIGS. 3 and 7 to 11 to describe an operating cycle of the machine.

It is supposed that, when the switch 16 is closed, the water in the boiler 30 is kept at the required temperature by the heating resistances controlled by the thermostat.

The system is in the condition of FIG. 4 with the tamper 84 and the counter-tamper 94 in the respective withdrawn positions.

It is also supposed that the container 54 is filled with coffee beans.

In order to prepare the desired number of cups of coffee, the programmer 18 is set by means of the knob 20 to the corresponding number of cups (one or two in the case shown).

After the cup or cups have been located beneath the spout 124, the push-button 22 is pressed to start the operating cycle. The programmer 18 now puts the coffee grinder 52 into operation for a period corresponding to the grinding of a suitable charge of coffee for one or two cups, according to the selection. The coffee grinder 52 is operated for this predetermined period and the ground coffee is transferred under the action of the screw 66 to the prechamber 64.

Once the grinding period has elapsed, the programmer 18 stops the coffee grinder 52 and causes the following events in succession:
- it operates the electric pump with all the solenoid valves closed and recirculation of the water which returns to the reservoir 24 through the tube 42;
- it opens the solenoid valve 46 associated with the actuator 50 to cause the advance of the cylinder 90 until the counter-tamper 94 obstructs the corresponding end of the percolation chamber 78, hermetic sealing being ensured by a toroidal washer 134; this condition is illustrated in FIG. 7;
- it opens the solenoid valve 47 associated with the actuator 48 to cause the advance of the cylinder 88; the tamper 92 therefore thrusts the ground coffee into the chamber 78 and compacts it, as illustrated in FIG. 8.

The stoppage of the cylinder 88 at the end of its advance stroke is determined by the fact that the pressure in the chamber 92 can compact the charge C no further, independently of the volume of this charge which corresponds to one or two cups (or more) to be prepared.

Once the time provided for the compaction has elapsed, the timer 18 causes the opening of the solenoid valve 41 with the introduction of the pressurized water in the boiler 30. The pressurized hot water then tries to enter the percolation chamber 78 through the inlet port 114. Since the charge C is compacted at the end, the pressurized water cannot break into the percolation chamber 78 but its pressure is transmitted through the charge itself to the tamper 92. The frontal area of the latter is greater than the rear area of its wall on which the pressure of water in the chamber 102 acts.

In the supply line to the actuator 48 is a plenum chamber 140 the outside of which is visible in FIGS. 2 and 3 and the section of which is shown in FIG. 4. The plenum chamber 140 includes a flexible diaphragm 142 on which the pressurized water supplied to the actuator 48 acts. Given the difference between the said areas, the pressure exerted by the water through the charge C in the percolation chamber 78 makes the cylinder 88 move backwards. This movement, which corresponds to the condition of FIG. 9, is allowed by the flexure of the diaphragm 142, as illustrated in FIG. 9.

As can be seen better in FIG. 4, a cup 144 is provided in the plenum chamber to limit the flexure of the diaphragm 142. The position of the cup 144 may be adjusted by means of a set-screw 146.

The withdrawal of the tamper 92 causes a reduction of the density of the charge C such as to allow pressurized water to pass into the cavity C in the manner illustrated in FIG. 6. This stage corresponds to FIG. 10.

The programmer 18 is thus arranged to close the solenoid valve 41 and stop the passage of water into the percolation chamber 78, after a predetermined time corresponding to the number of cups of coffee to be prepared. Preferably, however, the user of the machine may operate the programmer by means of a button 148 (FIG. 1) to stop the passage of water at the desired moment, in order to obtain less coffee than that programmed.

When the pressure in the duct 110 goes down the non-return valve 112 closes to prevent further undesirable dripping from the spout 124.

Irrespective of whether the programmer 18 has controlled the period of the supply of water to the percolation chamber 78 or whether this period has been controlled by the user, once the passage of water has stopped, the programmer 18 commands the following sequence:
- closure of the solenoid valve 47 associated with the actuator 50 whereby the counter-tamper 94 moves back to the position of FIG. 4 due to the action of the spring 98;
- maintenance of the water pressure in the actuator 48 whereby the cylinder 88 and its tamper 92 advance, as shown in FIG. 11, until the coffee grounds are expelled from the chamber 78 and fall into the vessel 134;
- closure of the solenoid valve 46 associated with the actuator 48 whereby the cylinder 88 and its tamper 92 return to the position of FIG. 4 in readiness for a subsequent operating cycle;
- stoppage of the electric pump 26.

One embodiment of an automatic machine for the preparation of espresso coffee has been described and illustrated which currently appears preferable. In particular, the arrangement of the percolation chamber 78, its tamper 92, and its counter-tamper 94 along a horizontal first axis, the arrangement of the inlet and outlet ports 114 and 116 along a second horizontal axis perpendicular to the first, and the vertical arrangement of the descending duct 62 containing the screw 66 appear preferable. These arrangements are not held to be limiting, however, and a machine could very well be conceived which had a vertical first axis and a descending duct which is inclined if not vertical. Thus, a machine according to the invention could also be conceived with an arrangement and configuration of the inlet and outlet ports other than that shown and described.

To advantage, a machine according to the invention may have a programmer which can be set so as to obtain the supply of hot water alone for the preparation of infusions such as tea, tisanes, etc.

What is claimed is:

1. Automatic machine for preparing espresso coffee from coffee beans, comprising:
    a coffee grinder driven by an electric motor and having a container for receiving a supply of coffee beans;
    a source of pressurized hot water;
    a percolation chamber connected by a supply duct to the output of the coffee grinder to receive a charge of ground coffee, and having means for closing the chamber and compressing the charge, means for expelling the coffee grounds, a port for the inlet of hot water from the source, and an outlet spout for the drink of coffee;
    a conveyor screw provided in the supply duct connecting the coffee grinder to the percolation chamber;
    transmission means operatively connecting a shaft of the electric motor to the conveyor screw;
    the conveyor screw having a pitch and the transmission means having a transmission ratio such that, in operation, the ground coffee in the supply duct is moved at a rate higher than the rate at which the ground coffee is supplied from the coffee grinder; and
    programmed means for controlling a cycle comprising, in succession, the grinding of the coffee and its supply to the percolation chamber, closure of the chamber and compression of the charge, percolation, and expulsion of the exhausted coffee grounds.

2. Machine according to claim 1, characterised in that the supply duct (62) containing the screw (66) is a descending duct at the end of which is a prechamber (64) associated with the percolation chamber (78), and in that the means for closing the chamber and compressing the charge of coffee include a tamper (92) reciprocable between a withdrawn position in which it does not occupy the prechamber (92) and closes its side opposite the percolation chamber (78) and an advanced position in which it compresses the charge (C) in the percolation chamber and seals the chamber.

3. Machine according to claim 2, characterised in that the percolation chamber (78) is a through-chamber with open ends, one being a continuation of the through-chamber and the other, as part of the closure means for the chamber, being associated with a counter-tamper obturator (94) movable towards and away from an advanced position in which it closes this other end both to allow the compression of the charge (C) of ground coffee in the chamber by means of the tamper (92) and to seal the chamber and in that the tamper (92) is movable to an even more advanced position beyond the said other end of the chamber to expel the compressed coffee.

4. Automatic machine for preparing espresso coffee from coffee beans, comprising essentially:
    a motor-driven coffee grinder with a container for receiving a supply of coffee beans;
    a source of pressurised hot water;
    a percolation chamber connected through a supply duct to the output of the coffee grinder to receive a charge of ground coffee, and having means for closing the chamber and for compressing the charge, means for expelling the compressed coffee, a port for the inlet of hot water from the source, and an outlet spout for the drink of coffee, and
    programmed means for controlling a cycle comprising, in succession, the grinding of the coffee and its supply to the percolation chamber, closure of the chamber and compression of the charge, percolation, and expulsion of the exhausted coffee grounds, characterised in that the percolation chamber (78) has an associated prechamber (64) into which the supply duct (62) opens, in that the means for closing the percolation chamber (78) and compressing the charge (C) of coffee comprise a tamper (92) which is reciprocable between a withdrawn position in which it does not occupy the prechamber and closes its side opposite the percolation chamber and an advanced position of compressing the charge (C) in the chamber and sealing the chamber in that the percolation chamber (78) is a through-chamber with open ends, one being a continuation of the through-chamber and the other, as part of the means for closing the chamber, being associated with a counter-tamper obturator (94) movable towards and away from an advanced position in which it closes the other end both to allow the compression of the charge (C) of ground coffee in the chamber by means of the tamper (92) and to seal the chamber and in that the tamper (92) is movable to an even further advanced position beyond the said other end of the chamber to expel the compressed coffee.

5. Machine according to claim 4, characterised in that the tamper (92) and the counter-tamper (94) form parts of respective single-acting linear hydraulic actuators (48, 50) supplied with the same pressurised water from the source for their advance and returned resiliently to their withdrawn positions.

6. Machine according to claim 5, characterised in that the linear hydraulic actuators (48, 50) are of the type with fixed pistons (84, 86) and movable cylinders (88, 90), the tamper (92) and the counter-tamper (94) being constituted by corresponding heads of the cylinders.

7. Machine according to claim 5, characterised in that the actuator (48) comprising the tamper (92) is connected to the pressurised water supply through a duct in which there is a plenum chamber (140) with a diaphragm (142) which is resiliently deformable as a result of a differential counter-pressure on the tamper (92) due to the thrust of the pressurised water introduced into the percolation chamber (64), whereby a slight withdrawal of the tamper is achieved to reduce the density of the charge (C) to a suitable value for percolation.

8. Machine according to claim 4, characterised in that the percolation chamber (78) has a single inlet port (114) for the pressurised hot water located at one side, and a grating wall (116) for the outlet of the coffee drink located on the opposite side and communicating with the spout (124) to achieve a flow of water with a fan-shaped path (F) through the charge (C) of ground coffee.

9. Machine according to claim 4, characterised in that the tamper (92), the counter-tamper (94), the prechamber (64), and the percolation chamber (78) are aligned along a horizontal first axis, the supply duct (62) opens vertically into the prechamber (64), and the inlet port (114) and outlet port (116) are aligned horizontally along a second axis perpendicular to the first.

10. Machine according to claim 4, characterised in that it has adjustable programming means (18) for predetermining the operating period of the coffee grinder (52) in correspondence with the charges of coffee ground for one, two or more cups, and for starting, at the end of the loading of the prechamber (64), an operating cycle including, in succession, the advancement of the counter-tamper (94), the advancement of the tamper (92) until the charge (C) is compacted, the introduction of pressurised hot water into the percolation chamber (78) for a period corresponding to the preparation of the prearranged number of cups of coffee, the withdrawal of the counter-tamper (94) and further advance of the tamper (92) to expel the coffee grounds from the percolation chamber, and finally the withdrawal of the tamper (92) in readiness for the subsequent cycle.

11. Machine according to claim 4, characterised in that the pressurised hot water source comprises a metal boiler (30) supplied by an electric pump (26) and provided with electrical resistances, and the percolation chamber (78) is formed in a metal block (72) in heat-exchange contact with the boiler.

12. Machine according to claim 11, characterised in that the body of the boiler (30) is thermally connected, without discontinuity, to an overlying metal support plate (132) which constitutes part of the top of the casing (12) of the machine and which serves as a preheating plate for the cups.

13. Automatic machine for preparing espresso coffee from coffee beans, comprising essentially:
   a motor-driven coffee grinder with a container for receiving a supply of coffee beans;
   a source of pressurised hot water;
   a percolation chamber connected through a supply duct to the output of the coffee grinder to receive a charge of ground coffee, and having means for closing the chamber and compressing the charge, means for expelling the compressed coffee, a port for the inlet of hot water from the source, and an outlet spout for the drink of coffee, and
   programmed means for controlling a cycle comprising, in succession, the grinding of the coffee and its supply to the percolation chamber, closure of the chamber and compression of the charge, percolation, and expulsion of the exhausted coffee grounds, characterised in that the percolation chamber (78) has a single port (114) for the inlet of the pressurised hot water located on the one side and a grating wall (116) for the outlet of the coffee drink located on the opposite side and communicating with the spout (124) to obtain a flow of water with a fan-shaped path (F) through the charge (C) of ground coffee.

14. Machine according to claim 13, characterised in that the percolation chamber (64) is cylindrical, the inlet port (114) is located at a point intermediate the axial ends of the chamber, and the grating wall (116) corresponds to a wide cylindrical sector which occupies substantially the entire length of the percolation chamber and is centred on the inlet port.

* * * * *